INVENTOR.
EDWARD F. BURTON
BY
Edwin Coates
ATTORNEY

INVENTOR.
Edward F. Burton
BY
Edwin Coates
ATTORNEY

Sept. 11, 1956      E. F. BURTON      2,762,613
COMBINATION ROTARY KITCHEN APPLIANCE
Filed Aug. 5, 1952      4 Sheets-Sheet 3
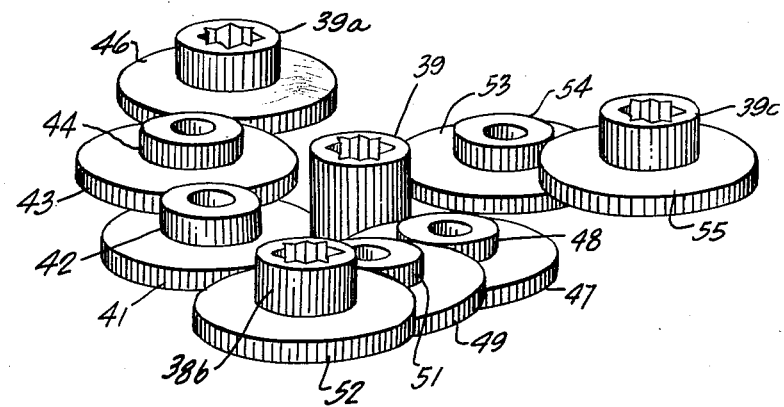
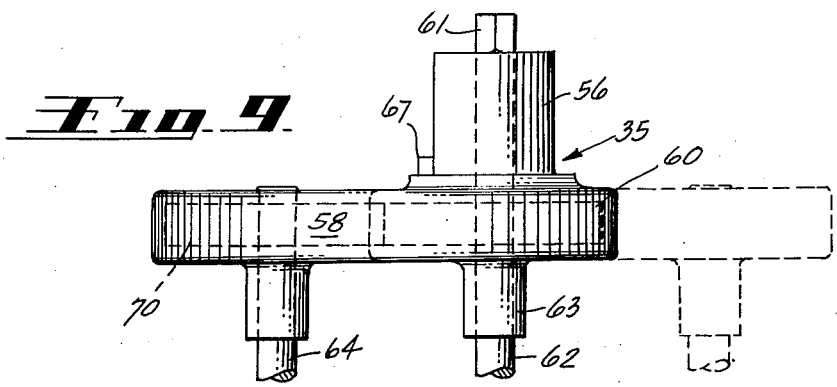
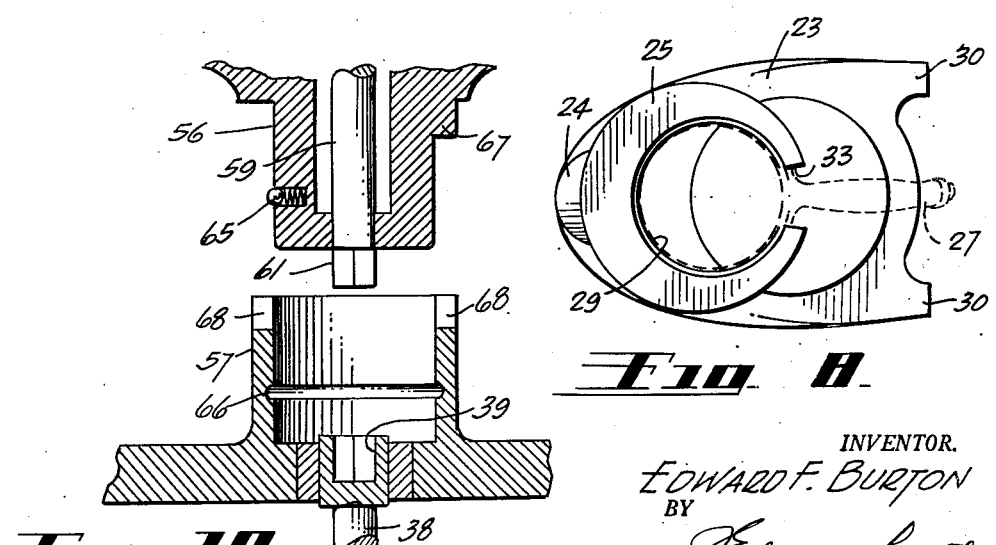
INVENTOR.
EDWARD F. BURTON
BY
Edwin Coates
- ATTORNEY -

Sept. 11, 1956     E. F. BURTON     2,762,613
COMBINATION ROTARY KITCHEN APPLIANCE
Filed Aug. 5, 1952     4 Sheets-Sheet 4
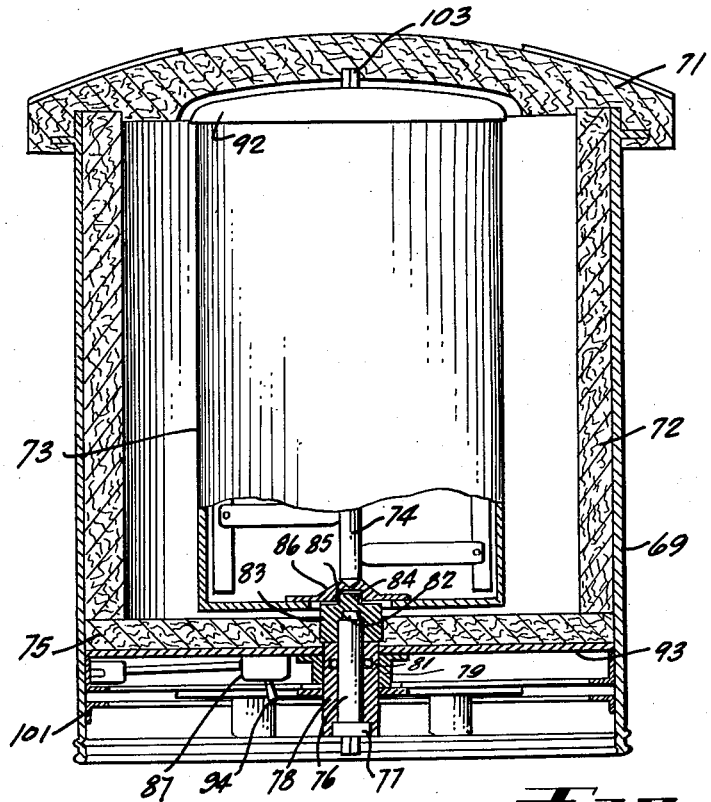
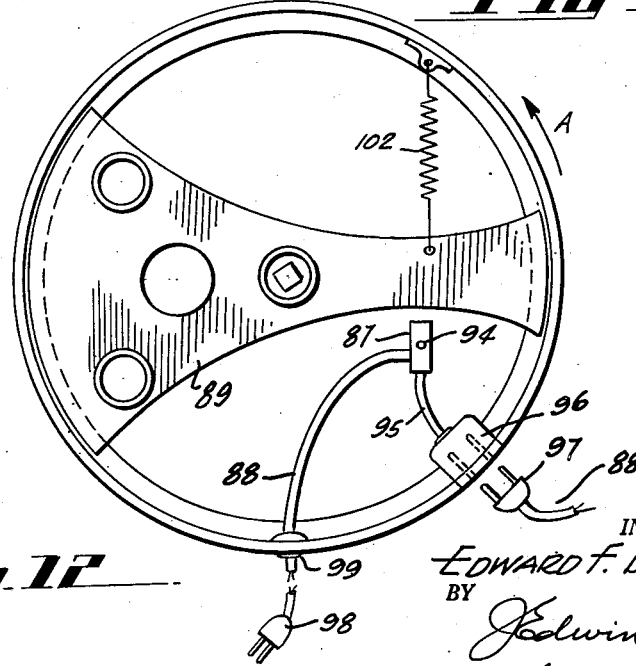
INVENTOR.
EDWARD F. BURTON
BY
Edwin Coates
- ATTORNEY -

United States Patent Office 2,762,613
Patented Sept. 11, 1956

2,762,613

COMBINATION ROTARY KITCHEN APPLIANCE

Edward F. Burton, Los Angeles, Calif.

Application August 5, 1952, Serial No. 302,709

10 Claims. (Cl. 259—58)

This invention relates to electrically operated domestic kitchen appliances, and particularly concerns the means for powering and supporting such appliances.

Quite a number of different types of power-applying and supporting means would be required to enable a single kitchen to employ all the available kinds of rotary appliances that could be used in the kitchen. No single appliance powering and supporting apparatus hitherto proposed is capable of universal service, that is, of supporting and driving all the necessary types of appliances. It has of course been proposed to provide and employ special adapters, transmissions and the like between the output of the power-egg and the input of the appliance to enable the egg, normally driving only overhead-drive or top-driven appliances, to drive bottom-driven or side-driven appliances and to provide the necessary variety of torques and speeds. However, aside from the inordinate total cost of such equipment and especially of the set of variable speed and torque motors, the total bulk of such equipment is a factor of no negligible proportions.

For, in the modern compact kitchen, storage space is often at a premium and seldom is there available sufficient "spare" storage space to accommodate the several sets of motors, stands, adapters, gear boxes and the like that would be required, under conventional schemes, for operating the wide range of appliances contemplated by the present invention.

An incidental shortcoming of the conventional such apparatus is that it cannot accommodate and operate ice-cream freezers of any but a very limited size and these small freezers require continual opening and closing by hand for inspection of the consistency of the contents. No means are available for indicating whether or not the mix is frozen.

Several other serious imperfections of contemporary apparatus will become manifest hereinafter and the present invention provides a single powering and supporting unit that ameliorates all these conditions and, while minimizing the cost to the householder and reducing storage space far below that heretofore possible, will accommodate and operate every type of rotary kitchen appliance now on the market. Moreover, the unit does so without the aid of adapters, gear boxes, or other accessories. In order to operate appliances ranging from the high speed, low torque type exemplified by blenders, liquefiers, or "osterizers," down to the low speed, high torque type exemplified by rotary can openers and the like, the unit is provided with means for providing rotary drives ranging from a normal of around 18,000 R. P. M. with a concomitant low torque, down to a normal of 666 R. P. M., and a correspondingly high torque.

An incidental advance achieved by the invention resides in the elimination of the necessity for continually opening and closing the ice-cream freezer mentioned hereinabove. By means placing the rotary motion of the power unit in train, or series, with a shut-off switch operatively adjacent to a can-and-tub torque responsive actuating arm, the power is shut-off automatically by the torque produced by the hardening of the contents of the freezer can to the desired, predetermined consistency.

The unit essentially comprises a stand configured to support a detachable and invertible power-package in the upper arm in each of two oppositely directed, vertical, driving positions. The unit can be positioned in several attitudes and configurations to enable it to drive top-drive appliances, bottom drive appliances and side drive appliances. By "plugging in" appliance's input shaft to any one of a plurality of power take-off means in the face of the power package, the unit can be utilized as a blender, liquefier or the like; a beater, mixer, stirrer or analogue; a freezer or the like; and a coffee mill, can opener, knife grinder, meat comminuter or the like. The power-package is provided with transmission means built into same and connected to the electric motor shaft so as to provide a plurality of gear trains, each terminated by a novel socket connection for the appliance shaft, that provide a variety of speeds and torques for rotating a variety of appliances at the respectively different angular velocities and torques requisite for their proper functioning.

The novel stand, support or frame that carries the novel removable and invertible power-package and supports the appliances is so configured with this package that the stand and unit can both be positioned upright with the driving face down, for overhead driving and the package itself can be inverted in the upright stand with the driving face up for enabling drive of bottom drive appliances. To enable operation of side-drive appliances without the aid of accessories, the stand can be rested on its side in a horizontal attitude, the base of the stand and the handle on the package then serving as supporting legs.

The power unit and the stand are provided with mutually co-acting means locking the package in the stand against axial displacement along the vertical axis of the stand and a slot in one arm of the stand engages the handle at all times to prevent rotational displacement of the elongate package around its major axis.

As this disclosure proceeds, certain other, perhaps secondary, features of advancement will be made manifest or become apparent, so that by no means are the foregoing statements to be construed as constituting the totality of the novelty and inventiveness inherent in the present invention or in this disclosure thereof.

Several of the preferred ones of the many embodiments of the invention at present contemplated are hereinafter described in constructional detail in conjunction with the accompanying drawings. However, these specific disclosures are furnished solely to render the inventive concepts more concrete and in no wise constitute the sole embodiments the concepts can assume. The invention is limited in the embodiments it can assume and in its scope only by the ambit of the sub-joined claims defining the configurational essence of the concepts.

In the accompanying drawings,

Figure 1 is a vertical elevation, partly in section, of the unit with the power-package disposed in that vertical attitude which it occupies in driving a "top-drive" appliance, such as a mixer, egg-beater, or the like;

Figure 2 is a similar view showing the unit with the power package disposed in an inverted vertical attitude for driving a "bottom-drive" type of appliance, such as a blender, whipper, or the like;

Figure 7 is a detail perspective view of the multiple power take-offs per se, also showing the respective driving gear trains therefor;

Figure 8 is a top plan view of the stand or bracket with the power egg shown in dotted lines;

Figure 9 is a fragmentary side elevation of a fit-applicable to a pair of beater or mixer elements for enabling the pair to operate in unison in each of two laterally separated positions thereby to adapt the pair to operate on the contents of containers of widely varying sizes;

Figure 10 is a fragmentary longitudinal sectional view of one of the power take-offs and the driven element of an associated appliance, or "driven-load," taken to show the mode of effecting the disengageable engagement of these two components;

Figure 11 is a vertical section, partly in elevation, of the novel freezer unit adapted for use with the present novel power package and bracket, showing the details of the automatic switch-operating means for de-energizing the power-unit, and Figure 12 is a bottom plan view of the device of Figure 11.

Figure 1:
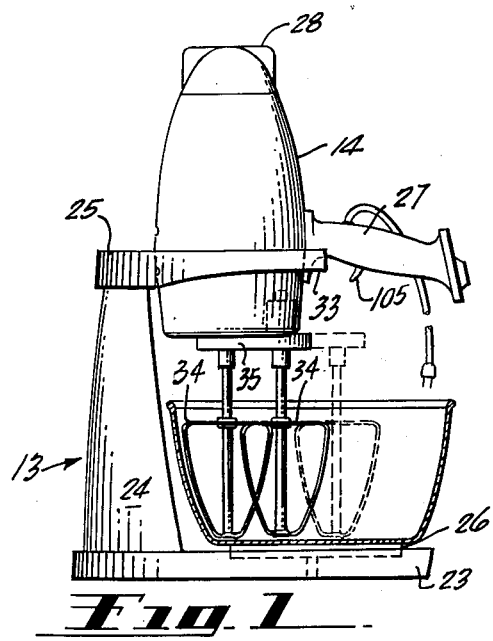

The essential configuration of the power-unit and examples of its augmented range of utility are indicated in Figures 1–4 inclusive, in which the unit is shown as basically comprising a two-position bracket, stand, or support 13 carrying an invertible power-package 14 in either of two oppositely directed vertical positions. The stand is adapted to support a container, as shown in Figure 1, and the power package itself is adapted to directly support the driven appliance.

Figure 6:
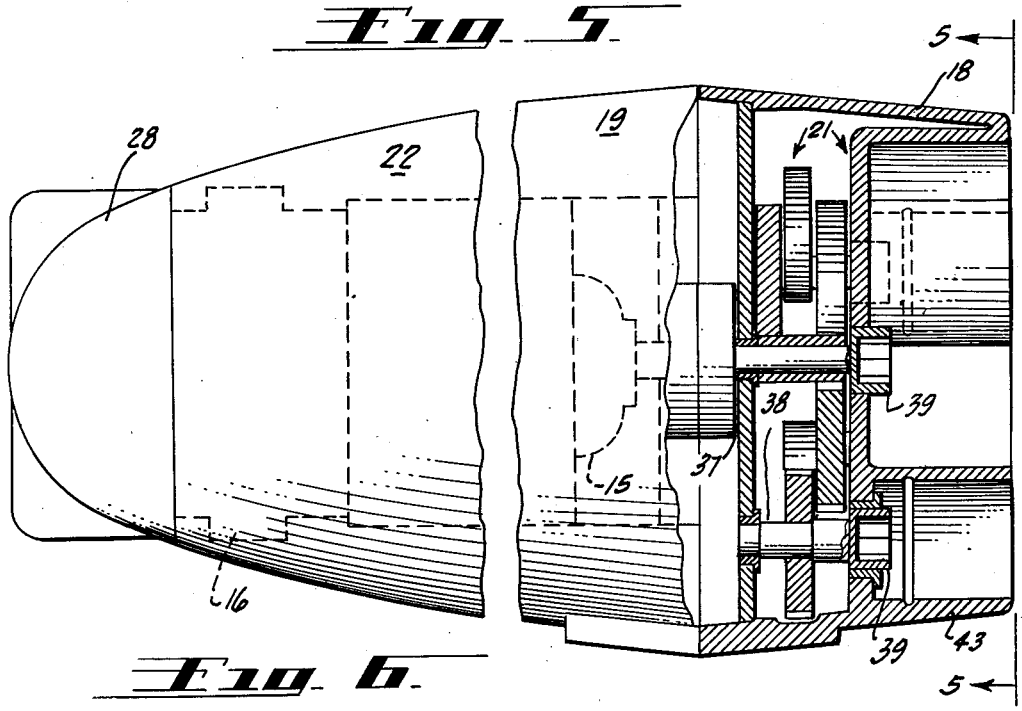
Figure 6 is a fragmentary side view, partly in longitudinal section, of the reversible-position power package.

The novel power package 14 includes, as best seen in Figure 6, an electric motor 15, preferably of the synchronous type and "built-in" controls 16 therefor. The motor and controls are mounted in a shell 17 which comprises at the one end thereof, a pair of coaxial, frusto-conical solids of revolution 18 and 19 abutted at their bases. Portion 18 encloses the driving ratio and power take-off group 21 and portion 19 encloses the motor output end. The remainder 22 of the shell 17 is ovoidal in shape, the rear portion 28 constituting a two-speed switch. Handle 27 bears "on-off" switch 105.

The stand 13 essentially consists of a base 23 having a broad, square cornered forward portion at 30, 30 and a rounded rearward portion to which is fixed a stanchion 24 carrying an arm 25 at its upper end. Base 23 carries a turntable 26 for rotatively supporting a mixing bowl or the like. The power package 14 bears a laterally extending handle 27.

Arm 25, which is generally C-shaped in plan view, extends substantially parallel to the base and is provided with several instrumentalities for stably and securely supporting the power-package in two oppositely directed vertical attitudes. To these ends, the arm is provided, first, with a frusto-conical aperture 29 extending from top to bottom face of the arm with the base of the cone on the upper face of said arm. At a suitable point on the periphery of aperture 29, the wall thereof is provided with a retractable detent device, such as the spring-biased ball type catch group 31.

Either one of the frusto-conical surfaces 18 and 19 can be seated in the aperture 29, and each frusto-conical surface 18, 19 is provided with a detent-engaging depression 32.

The power-package is, by these means, adapted to be securely mounted in arm 25 in either of the two vertical attitudes being restrained against axial displacement by the detent group. The outer end of the C-shaped arm 25 has a bifurcation or slot 33 therein adapted to receive the handle of the package, thereby to restrain same against bodily rotation.

With the package occupying the "face-down," or overhead-driving position shown in Figure 1, the unit is adapted to operate numerous kinds of overhead driven kitchen appliances cooperating with vessels mounted on the turntable. For example, as shown in Figure 1, the thus-configured and attitudinized unit is adapted to drive a pair of beater, mixer or impeller elements 34 and to enable them to operate properly with bowls of various sizes. A plug-in type adapter 35, shown in detail in Figure 9 and described in conjunction with the power take off, is included to enable the beater pair to be swung from the solid line position to the dotted line position, thereby to operate on the contents of small bowls and large bowls, respectively.

Figure 2:
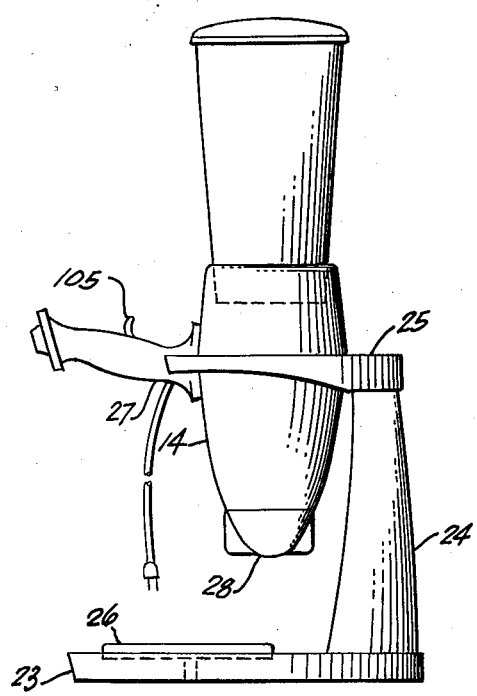
Figure 3:
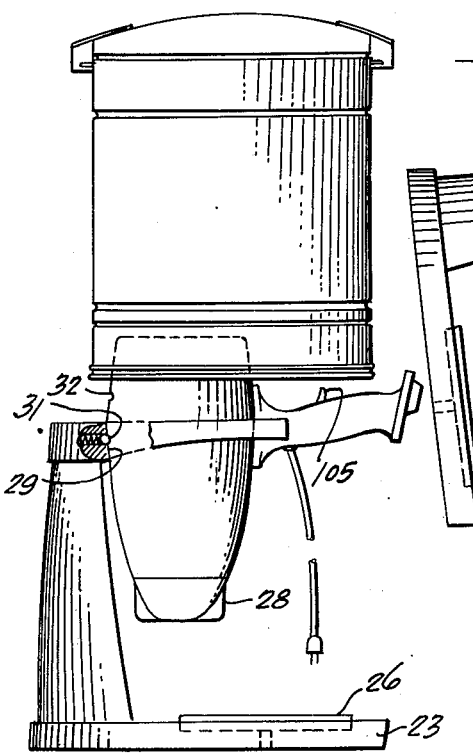
Figure 3 is a view similar to that of Figure 2, but sighting the same face of the supporting bracket as that shown in Figure 1 and again showing the power package disposed in its inverted vertical attitude for driving an ice-cream freezer.

When the unit is re-configured, as shown in Figures 2 and 3, with the package occupying the face-up, or bottom-driving position, all "bottom-drive" appliances, such as the whipper-blender shown in Figure 2 and the ice cream, or the like, freezer shown in Figure 3, can be readily and compactly fitted to the present unit without the aid of the adapters, special gear boxes, or other auxiliary fittings. By virtue of the low center of gravity of the power package and the relatively wide, elongate base arm of the stand, the center of gravity of the laterally compact assembly can be made to lie sufficiently low to provide the assembly with adequate stability. If need therefor is contemplated, the lower arm may be mass-weighed.

Figure 4:
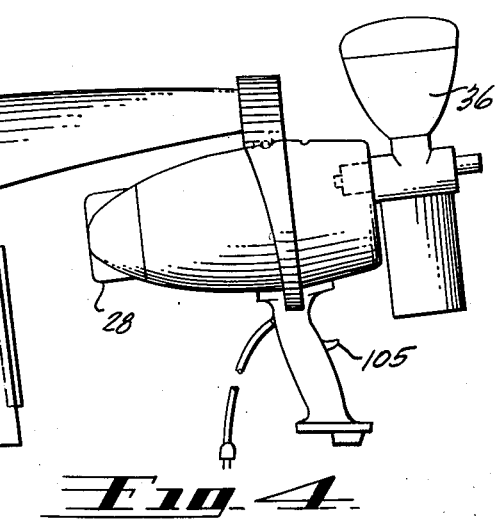
Figure 4 is a side view of the unit with both the bracket and the power package disposed substantially in the horizontal attitude for driving a "side-drive" type of appliance, such as a coffee mill.

As shown in Figure 4, the novel unit is also capable of functioning in a substantially horizontal attitude with the arm-locked handle of the package serving as the one "pointed" leg of a mainly lengthwise extending supporting frame and the base 23 serving as the other, wide-faced leg of such frame. This "frame" is given stability by the fact that the handle curves laterally outwardly at its "lower" end, by the inward location of the center of gravity of the package and by the relatively large width of the edge-face of the base 23, as well as the wide separation of the handle and the base.

Accordingly, in this attitude the unit is well fitted to support and drive such "side-drive" appliances as the coffee mill 36 shown in Figure 4, especially since the "back-slant" to the left of the arms of the unit positions the engaging face of the power take-off unit at a leftward slant, compelling the mill to also slant leftwardly and thereby further aid in positioning the center of gravity of the assembly closer to the base arm, instead of the mill, or the like, causing the center of gravity to lie too far to the right.

The novel means provided by this invention for enabling a single, standardizable unit to drive rotary kitchen appliances of widely varying natures consequent upon their varying torque and angular velocity requirements, with these appliances in the several attitudes shown, are shown in Figures 5, 6, 7, 9, and 10, as combined with the motor and controls in the novel power-package. These means, further, enable the unit to incorporate a standardizable, inexpensive substantially constant speed and torque electric motor operating within very narrow speed ranges as contrasted to that of the motor of the conventional such apparatus.

Briefly, these means consist of a multi-transmission and novel driving-connection concept including a "four-drive" power ratio and take-off group 21 preferably built into the wider end, or truncate operating face, of the power package and including a multi-socket type plug-in arrangement for the input shafts of the various types of appliances.

Figure 5:
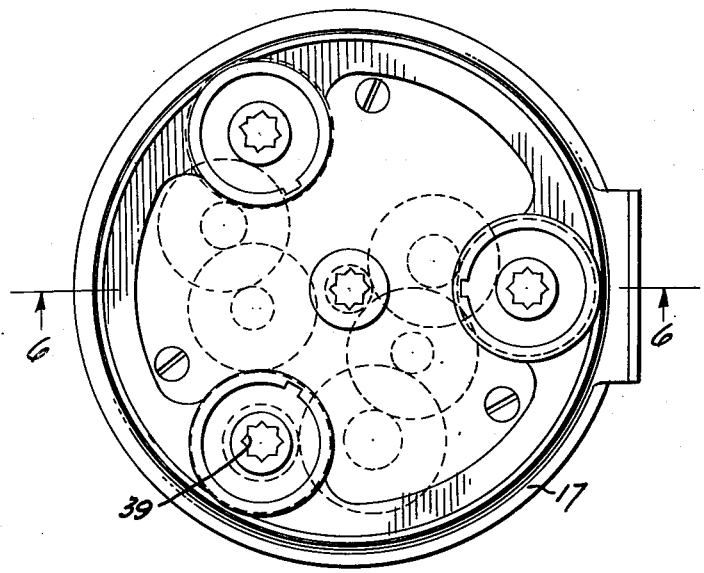
Figure 5 is an end-view of the power package per se, sighting at the power take-off end thereof, that is, along line 5—5 of Figure 6.

The gearing shown in Figures 5, 6 and 7 provides drives in the package for the socket connections at a series of gear ratios that produce a number of speeds and torques to rotate the different appliances at the appropriate respective speeds and torques.

For example, the centrally disposed socketed takeoff 37 is directly connected to the motor shaft and directly connected to the appliance. In its usual design, it has a normal rotary speed of the order of 18,000 R. P. M.

Three other power-takeoffs are provided in the transmission group at the truncate end of the power package. Each takeoff includes a lay shaft 38 terminated outwardly by a "double-squared" socket 39 adapted to receive the "squared" end of the input shaft of an appliance in either of the two positions shown. As shown in Figure 7, each of the sockets bears a driving gear attached facewise thereto.

These three takeoffs are grouped around the central direct-drive shaft or motor shaft as shown in Figures 5, 6, and 7 and are driven at three different torques and angular velocities by three gear trains, each terminating at its inner end in mesh with the peripherally gear-toothed central drive shaft and each train terminating at its outer end in a driven gear to the face of which is attached a power takeoff socket for engaging the input end of a certain class or type of appliance according to its particular torque and velocity requirements.

The right hand socket 39c, as seen in Figure 7, is that which has the highest velocity next to that of the central shaft, with a total gear reduction therefrom of about 10 to 1. Its gear train consists of relatively large gear 53 meshing with the teeth on the central shaft below socket 39, small gear 54 mounted facewise on gear 53, and large gear 55, meshing with gear 54 and carrying socket 39c on its upper face. The velocity and torque resulting from this combination are suitable for driving mixers, beaters, and the like.

The second gear train includes large gear 47, meshing with the teeth on the central shaft, small gear 48 carried facewise thereby, large gear 49 driven by gear 48 and carrying small gear 51, and large gear 52 meshing with gear 51 and carrying socket 38b. This combination produces a total gear reduction of about 20 to 1 which is suitable for driving medium speed devices such as knife grinders, centrifugal juice extractors, and the like.

The third gear train includes the train last described and, in addition, gear 41 driven by gear 52, gear 42 carried thereby and driving gear 43, gear 44 carried thereby and driving gear 46, and socket 39a carried by the last said gear. The total gear reduction in this combination is of the order of 30 to 1 for driving the lowest speed, highest torque appliances including coffee-mills, ice comminuters or crushers, meat grinders, and ice cream freezers.

As shown in Figure 9, when the present unit is in combination with a mixer, beater or like appliance consisting merely of a pair of separate rotary impellers, the plug-in "flip-over" or adapter 35 shown as a cylinder and rectangle in Figure 9 is utilized both to, as it were, yoke the two impellers into a unit and to provide means for shifting the center of rotation of the unit leftwardly or rightwardly, in this figure. By the latter characteristic, the appliance is rendered capable of operating in bowls or mix-containers of a considerable range of diametral size, merely by swinging the unit about its vertical axis from the solid line position, say, to the dotted one.

To these and other ends, this component of the concept consists of a hollow casting comprising an upright cylindrical portion 56 adapted to fit in the sleeve 57 (see Figure 10) surrounding the central, or motor shaft, the casting also including a laterally elongate hollow gear box 58 preferably integral with the cylinder. The cylinder centrally bears a shaft 59 coaxially mounted therein, the shaft terminating at the one end in a squared-off portion 61 and terminating at the opposite end in a portion 62 of the shaft of the impeller, a guide collar 63 being provided around this portion of the shaft. Shaft 59 bears, in that portion of same which lies in the box 58, a driving spur gear 60. In its outward portion, the box bears a driven spur gear 70 fixed to the upper end of the shaft 64 of the other impeller.

At a point on the outer periphery of the cylinder of the fitting 35, a retractable detent, such as a spring biased ball unit 65 is mounted and is adapted to engage in an annular groove 66 on the inner surface of the sleeve 57 surrounding the socketed end of the central shaft of Figure 10. A lateral key 67 is provided on the periphery of the cylinder, as shown in Figure 10 and a pair of corresponding slots or seats 68 for the key are provided in the adjacent end of the sleeve 57 of Figure 10. The mode of establishing the connection between the swingable beater-fitting or adapter of Figure 9 and the central drive shaft of Figure 10 is made obvious in Figure 10.

Thus, the same stand, power unit and turntable of the present unit can be employed to drive the dual-beaters in mixing-containers of widely varying diameters and in two different positions, in the innermost one of which the off-center position of the beaters with respect to the center line of turntable 26 causes gradual rotation of the bowl for better mixing. In the other position, the beaters are on center and suitable for use with small bowls.

The freezer shown in Figure 3 may be a more or less conventional bottom drive freezer or may be constructed, as shown in Figures 11 and 12, in such improved configuration as to obviate the necessity for continual inspection of the contents of the freezer can to ascertain whether the contents have reached the desired consistency, as well as to provide for turning off the motor automatically when such consistency has been reached.

To the latter end, the construction comprises a tub made up of an outer hollow cylindrical shell 69, open at its upper end except for a tightly-fitting tub lid 71, and a coaxial, shorter and thicker inner cylindrical shell 72, also open at its upper end except for the lid 71. A freezer can 73, cylindrical in form and having a length somewhat less, and a diameter considerably less, than those of the tub, is mounted coaxially of the tub for rotation about its vertical axis. A multi-blade dasher 74 is mounted coaxially of the can, its lower end being socketed on a bearing in the base of the can.

The space lying between the bottom 75 of the inner shell of the tub and the lower end of the outer shell of the tub is occupied by means for connecting the proper one of the power take-offs to the bottom of the can and by means for automatically de-energizing the motor and stopping the rotation of the parts when the "mix" in the freezer can is ready for use.

The aforesaid connecting means include a shaft 76 having an outer end rectangular in cross-section for fitting into the corresponding socket 39a of the lowest speed drive. The shaft 76 is formed with a collar 77 to limit endwise movement of the shaft in one direction in bearing 78 which is fixed to collar 79 and bottom plate 93 and thus to the basic structure of the tub. Cap 83 is connected to the upper end of shaft 76 by the screw thread connection 82 and limits movement of the shaft 76 in the opposite direction. A sealing ring 81 is provided to prevent leakage of brine thru the bottom of the tub around the shaft.

The upper face of the cap bears a squared boss 84 fitting into the squared socket 85 of the pillow block 86 forming the central part of the bottom of the freezer can. The latter may therefore be rotated around dasher 74 by shaft 76 from the power drive below the tub and still be readily removable for cleaning. The upper end of the dasher rod passes freely thru the lid of the can and is fixed by squared connection 103 against rotation with respect to the lid 71 and the tub 69.

The means for automatically halting the rotary motions involved, by de-energizing the motor, thereby concurrently giving an overall visual indication of the completion of the freezing operation, essentially consist of an electrical cut-off switch 87 carried by the bottom wall of the freezer tub and series connected in the motor-energizing circuit 88; a rotary, switch-actuating arm 89, arranged to undergo relative rotation with respect to the rotatable tub when the latter is rotated on occasions later described; the independent mounting of the can on the upper end of the drive shaft, segregating it from the rotational movement of the tub as just mentioned, and the means 103 for transferring rotational forces, imparted to the freezer can and thence thru the stiffened mix in the can, to the dasher and thence to the lid of the tub fixed to the tub wall, thereby to create the relative rotational displacement of the switch actuator arm and the switch.

The motor cut-off switch 87 is mounted on a partition 93 that supports the tub-liner 72, with its actuated-lever 94, normally spring biased to a circuit closing position, and extending downwardly into the plane of the relative rotary motion taking place between the actuator-arm and the tub-wall 69. A conductor path 95 leads from the switch to the electric plug-type receptacle 96 mounted on the inner face of the tub-wall. This receptacle is adapted to receive the prongs of an electrical plug 97, connected by conductors 88 into the motor operating circuit of the power egg. The other terminus of this circuit bears a wall-plug 98, which is connected, via a grommet 99 in the tub wall, to the other side of the switch by conductor path 88.

The switch-actuator arm 89 consists, in this particular embodiment of the invention, of an elongate, two-headed planeal member having a central aperture for loosely fitting around the bushing 78 with the member 89 resting on the ends of the three power take-offs 39a, 39b, and 39c and overlying the upper face of the annular flange 101 attached peripherally to the adjacent wall of the outer casing of the tub.

In its normal position, arm 89 lies laterally to the one side of and closely sub-adjacent the motor shut-off switch 94, and is maintained in this position by its three point contact with the unused power take-offs and by a fairly strong tension spring 102. The latter yieldingly prevents the arm 89 from being rotated with respect to the tub until the mix has reached the desired consistency.

When, however, the mix in the freezer can arrives as the desired predetermined consistency, the torque of the freezer can is transmitted through the frozen mix to the dasher, which is thereby rotated, say, in a counter-clockwise direction as viewed in Figure 12 and indicated by arrow A. The tub lid, being irrotationally fixed relatively to the dasher and to the tub itself, transmits the torque and effects rotation of the tub in the direction of arrow A. Since the shut-off switch is secured to the partition in the bottom portion of the tub and rotates with it and since the actuator-arm remains stationary, eventually the switch lever and the edge of the arm are brought into contact, thus actuating the switch arm so as to open the motor energizing circuit. This contact occurs almost immediately after the mix reaches the predetermined consistency, since there is thereby interposed between the mix and the switch-lever, a substantially rigid system of torque-transmitting members almost instantaneously responsive to the stiffening of the mix.

Although a number of embodiments of the present inventive concepts have been shown and described in considerable and specific configurational detail, it is to be comprehended that none of the specific shapes, sizes, compositions, design-details or the like ostensible characterizations in any manner constitute restrictions of the scope and nature of the invention to these details. All changes and modifications incorporating the spirit of the invention are to be considered as lying within the scope of the following claims.

I claim:

1. An actuator unit for driving "side-drive" rotary kitchen appliances, comprising: a supporting frame including a pair of transversely spaced arms; a stanchion rigidly connecting said arms at a pair of adjacent ends thereof, the opposite ends of said arms having a disposition such as to stably support said frame when it is laid on its side resting on said arms; an elongate power package mounted normally immovably in the one of said arms in substantial parallelism with said stanchion, said package having power take-off means at its outer end and a handle projecting transversely outwardly of the one side thereof and from the arm that supports said package and said handle having an end adapted to support the one end of said frame in said position, said arms and said handle sloping mutually away from the vertical and away from the geometrical center of the assembly so as to incline said power take-off means similarly, whereby a "side-drive" appliance can be operatively attached to said power take-off means in an attitude inclined similarly to the aforesaid, thereby to locate the center of gravity of the assembly including said appliance close to the geometrical center of the total assembly so as to stabilize same.

2. A power package, including: a shell; a prime-mover disposed coaxially of the one end portion of said shell and including a rotary shaft extending towards the other end of said shell; a plurality of power transmission means located near said other end of said shell and arranged around, and drivenly connected to, said shaft, each of said power transmission means including a power take-off shaft extending coaxially outwardly of said shell; a closure member for said other end of said shell, said closure member including a plurality of appliance-shaft receiving and locking sleeves, each sleeve being arranged around the outer end of a power take-off shaft, and a cylindrical guard wall surrounding said sleeves to protect said sleeves from damage and to furnish support to the base of a driven appliance.

3. An actuator unit for rotary kitchen-appliances, comprising: a supporting frame including a pair of transversely spaced arms; a stanchion normally extending upright between two adjacent ends of said arms and rigidly connecting same in said spaced relationship, the one of said arms having an aperture therethrough; contact retractable detent means disposed in said aperture; and an elongate power package including power take-off means at the one end thereof and means for engaging said detent means; said package being removably mounted in said aperture in a vertical attitude in engagement with said detent means with said power take-off means facing downwardly, thereby to adapt said actuator-unit to support and drive appliances of the top drive, or overhead drive, type; a pair of rotary beaters having upper ends; and power transmission means interposed between the upper end of said beaters and said power take-off means and operatively connected to said take-off means and said beaters for effecting rotation of said beaters in unison, said power transmission means being rotatably connectible to the one of said power take-off means, in either of two relations, whereby said transmission means may be laterally shifted, carrying said beaters into either of two different horizontal positions thereby to adapt said unit to support, and said beaters to operate upon, containers of widely varying diameters.

4. A combined frozen confection mixer and rotary actuator-unit therefor, comprising: a substantially rigid stand; a power package mounted thereon in substantially vertical position; mounting protuberances extending upwardly from the upper end of said power package, at least one of said protuberances including a power take-off; a mounting and switch actuating member mounted on said protuberances; a container mounted on said member for limited rotation with respect thereto and carrying a driven shaft extending downwardly therefrom into engagement with said power takeoff; means carried by said container including a member driven by said shaft for transmitting torque from said shaft through a thickened confection mixture to said container to cause rotation thereof with respect to said mounting and switch actuating member; a switch carried by said container normally biased to an "on" position and movable by said switch actuating member to an "off" position upon said relative rotation; electrical conductor means leading from said switch and connectible to a source of power; and other electrical conductor means leading from said switch and connectible to said power package; whereby the actuation of said power package may be controlled by the "on" and "off" condition of said switch.

5. A powered confection-freezer, comprising: an upright stand; a power package mounted therein in upright position and including upwardly facing, bottom-drive power-takeoff means; mounting means extending outwardly from said takeoff means; a switch-actuating member disposed on said mounting means; a first container mounted on said actuating member for predetermined rotation with respect thereto, said container carrying drive means therefor extending downwardly therefrom into engagement with said power take-off; a second container; means carried by said first container and including a member driven by said shaft for transmitting torque from said shaft thru a congealed confection to said second container to effect rotation thereof; a switch carried by the second container and normally in closed condition and movable therewith into contact with said switch-actuating member to move said switch to open condition; conductor means leading from said switch to an energy source; and other conductor means leading from said switch to said power package, whereby actuation of the power package and rotation and congelation may be controlled by said switch.

6. A rotary kitchen appliance device for use with a support having a generally horizontal base and an upstanding stanchion, comprising; an arm attached to the upper end of said stanchion and extending generally horizontally above said base; said arm being generally C-shaped with the gap thereof at a point opposite to said stanchion; and a power package comprising an elongate casing seated in said arm with its axis generally parallel to said stanchion; appliance driving means at one end of said casing and a handle extending laterally from the side thereof and extending thru said gap to prevent rotation of said casing in said arm.

7. A device as claimed in claim 6; said handle being of such length that its free end is substantially the same distance from the stanchion as is the free end of said base; whereby the assembly may be supported in a horizontal attitude on said free ends to operate side-drive appliances.

8. A device as claimed in claim 6; the inner periphery of said C-shaped arm constituting a frusto-conical upwardly diverging seat; said casing near one end thereof being provided with a pair of frusto-conical surfaces, base to base, adapted to be mounted in said seat to drive top-drive and bottom-drive appliances.

9. A device as claimed in claim 8; said handle being located approximately at the junction of said frusto-conical surfaces whereby it will extend thru said gap in either position of said power package to prevent rotation thereof.

10. Actuating means for rotary kitchen appliances, comprising: a power package including an elongate casing mounted on a support with power take-off means at the lower end of said casing; a second hollow elongate casing adapted to be disposed horizontally in adjacency to the lower end of the first said casing; a rotary shaft extending transversely thru one end of said second casing and adapted at one end for driven-connection to said take-off means and adapted at the opposite end to operate a rotary load; said second casing being swivelly mounted on said shaft and adapted to be swung laterally to a plurality of predetermined positions; means on said shaft in said second casing for transmitting power laterally in all positions of said casing; means in said second casing adapted for rotary driving by the power transmitting means; and a shaft extending from said driven means and adapted to drive a rotary load.

References Cited in the file of this patent
UNITED STATES PATENTS

| | | |
|---|---|---|
| 1,226,101 | Marsden | May 15, 1917 |
| 1,703,099 | Craddock | Feb. 26, 1929 |
| 1,762,081 | Schleicher | June 3, 1930 |
| 1,766,172 | Hiles | June 24, 1930 |
| 1,811,499 | Gilbert | June 23, 1931 |
| 1,864,549 | Paul | June 28, 1932 |
| 1,868,587 | Richards | June 28, 1932 |
| 1,944,245 | Krause | Jan. 23, 1934 |
| 1,955,279 | Fitzgerald | Apr. 17, 1934 |
| 1,958,900 | Marbury et al. | May 15, 1934 |
| 1,981,010 | Torson | Nov. 20, 1934 |
| 2,169,014 | Aaborg | Aug. 8, 1939 |
| 2,202,724 | Bean | May 28, 1940 |
| 2,255,478 | Allenby | Sept. 9, 1941 |
| 2,502,564 | Hansson | Apr. 4, 1950 |

FOREIGN PATENTS

| | | |
|---|---|---|
| 275,649 | Italy | June 28, 1930 |